United States Patent
Doss et al.

(10) Patent No.: US 10,723,912 B2
(45) Date of Patent: Jul. 28, 2020

(54) SYNTHESIS AND DEVELOPMENT OF POLYURETHANE COATINGS CONTAINING FLOURINE GROUPS FOR ABHESIVE APPLICATIONS

(71) Applicant: U.S.A. as represented by the Administrator of the National Aeronautics and Space Administration, Washington, DC (US)

(72) Inventors: Jereme R. Doss, Hampton, VA (US); John W. Connell, Yorktown, VA (US); Christopher J. Wohl, Jr., Portsmouth, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 413 days.

(21) Appl. No.: 15/367,943

(22) Filed: Dec. 2, 2016

(65) Prior Publication Data

US 2017/0158908 A1   Jun. 8, 2017

Related U.S. Application Data (60) Provisional application No. 62/263,191, filed on Dec. 4, 2015, provisional application No. 62/295,921, filed on Feb. 16, 2016.

(51) Int. Cl.

| | | |
|---|---|---|
| *B32B 27/40* | (2006.01) |
| *B32B 27/38* | (2006.01) |
| *B05D 1/02* | (2006.01) |
| *B05D 1/18* | (2006.01) |
| *B05D 3/00* | (2006.01) |
| *B05D 5/08* | (2006.01) |
| *C09D 163/00* | (2006.01) |
| *C09D 175/04* | (2006.01) |
| *C09D 175/08* | (2006.01) |
| *C09D 175/12* | (2006.01) |
| *C08G 18/48* | (2006.01) |
| *C08G 18/50* | (2006.01) |
| *C08G 18/73* | (2006.01) |
| *C08G 18/66* | (2006.01) |
| *C08G 65/333* | (2006.01) |
| *C08G 59/50* | (2006.01) |
| *C08G 18/75* | (2006.01) |
| *C08G 65/00* | (2006.01) |
| *C08G 18/24* | (2006.01) |
| *B05D 3/10* | (2006.01) |
| *C08G 18/32* | (2006.01) |
| *C08G 18/38* | (2006.01) |
| *C08G 18/58* | (2006.01) |
| *C08G 18/76* | (2006.01) |
| *C08K 3/22* | (2006.01) |

(Continued)

(52) U.S. Cl.
CPC ............ *C09D 175/12* (2013.01); *B05D 1/02* (2013.01); *B05D 3/002* (2013.01); *B05D 3/108* (2013.01); *C08G 18/246* (2013.01); *C08G 18/3206* (2013.01); *C08G 18/3812* (2013.01); *C08G 18/4825* (2013.01); *C08G 18/4833* (2013.01); *C08G 18/5015* (2013.01); *C08G 18/58* (2013.01); *C08G 18/6674* (2013.01); *C08G 18/73* (2013.01); *C08G 18/755* (2013.01); *C08G 18/7621* (2013.01); *C08G 59/50* (2013.01); *C08G 65/007* (2013.01); *C08G 65/33348* (2013.01); *C08K 3/22* (2013.01); *C08K 3/30* (2013.01); *C08K 3/36* (2013.01); *C09D 163/00* (2013.01); *C09D 175/04* (2013.01); *C08K 2003/2265* (2013.01); *C08K 2003/3009* (2013.01)

(58) Field of Classification Search
None
See application file for complete search history.

(56) References Cited

U.S. PATENT DOCUMENTS

| | | | |
|---|---|---|---|
| 5,100,569 A | 3/1992 | Nalewajek et al. | |
| 9,550,911 B2 * | 1/2017 | Wohl | C08G 59/066 |

(Continued)

OTHER PUBLICATIONS

Kirchner, M.E., "Laminar flow: Challenge and Potential", NASA Conference Publication 2487 Part 1, Research in Natural Laminar Flow and Laminar-Flow and Control, Proceedings of a symposium by NASA and held at Langley Research Center in Hampton, VA, Mar. 16-19, 1987.

(Continued)

*Primary Examiner* — Michael J Feely
(74) *Attorney, Agent, or Firm* — Jennifer L. Riley; Robin W. Edwards; Helen M. Galus (57) ABSTRACT

Various embodiments provide epoxy modified fluorinated urethane compositions that may provide desirable bulk mechanical properties of conventional coatings, adhesives, or structural matrix resins, while simultaneously exhibiting surface properties that may reduce surface contamination. Various embodiments provide formulations comprising epoxy modified fluorinated alkyl ether including urethane oligomer or polymer resins that may possess the requisite thermal, mechanical, chemical, and optical properties while achieving a low surface energy. In various embodiments, such resins may be prepared from random urethane oligomer compositions including fluorinated alkyl ether segments, in which the oligomers may be terminated with amino groups and subsequently reacted with epoxy including monomers or oligomers.

19 Claims, 2 Drawing Sheets

(51) Int. Cl.
　　　*C08K 3/30*　　　(2006.01)
　　　*C08K 3/36*　　　(2006.01)

(56) References Cited

U.S. PATENT DOCUMENTS

2002/0026006 A1* 2/2002 Garcia ............... C08G 18/0823
　　　　　　　　　　　　　　　　　　　524/591
2015/0344748 A1* 12/2015 Wohl ................... C09D 163/00
　　　　　　　　　　　　　　　　　　　428/408

OTHER PUBLICATIONS

Coleman, W.S., "Roughness Due to Insects", Boundary Layer and Flow Control, vol. 2, edited by G.V. Lachman, pp. 682-747, Pergamon Press, 1961.

Lachman, Dr. Ing G.V., "Aspects of Insect Contamination in Relation to Laminar Flow Aircraft", Ministry of Aviation Aeronautical Research Council, A.R.C. Technical Report, C.P. No. 484, 1960.

Zhou, R., et al., "Mechanical Properties and Erosion Wear Resistance of Polyurethane Matrix Composites," Wear, 259, (2005) pp. 676-683.

Gogoi, R., et al., "Effect of Soft Segment Chain Length on Tailoring the Properties of Isocyanate Terminated Polyurethane Prepolymer, a Base Material for Polyurethane Bandage," IJRET: International Journal of Research in Engineenng and Technology, vol. 2, Issue 10, pp. 395-398, Oct. 2013.

Tang, Y.W., et al., "Synthesis of Surface-Modifying Macromolecules for Use in Segmented Polyurethanes," J. Appl. Polym. Sci., vol. 62, pp. 1133-1145, 1996.

Wynne, Kenneth J., et al., "Model Fluorous Polyurethane Surface Modifiers Having Co-Polyoxelane Soft Blocks with Trifluoroethoxymethyl and Bromomethyl Side Chains," Langmuir, vol. 23, pp. 10573-10580, 2007.

Kaelble, D. H., "Dispersion-Polar Surface Tension Properties of Organic Solids," J Adhesion, vol. 2, Apr. 1970, pp. 66-81.

Hooper, "Adhesives: Urethane vs. Non-Urethane Products", Floor Covering News, May 9, 2011, https://fcnews.net/2011/05/adhesives-urethane-vs-non-urethane-products/, last retrieved Aug. 5, 2019, 3 pages.

National Institute for Occupational Safety and Health, "Isocyanates", Centers for Disease Control and Prevention website at https://www.cdc.gov/niosh/topics/isocyanates/default.html, Apr. 23, 2014, last retrieved Aug. 5, 2019, 5 pages.

* cited by examiner

SYNTHESIS AND DEVELOPMENT OF POLYURETHANE COATINGS CONTAINING FLOURINE GROUPS FOR ABHESIVE APPLICATIONS

CROSS-REFERENCE TO RELATED PATENT APPLICATION(S)

This patent application claims the benefit of and priority to U.S. Provisional Patent Application No. 62/263,191, filed on Dec. 4, 2015 and to U.S. Provisional Patent Application No. 62/295,921, filed on Feb. 16, 2016, the contents of both applications are hereby incorporated by reference in their entireties.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

The present invention generally relates to random urethane oligomer compositions including fluorinated alkyl ether segments, in which the oligomers may be terminated with amino groups and subsequently reacted with epoxy compounds and/or oligomers to produce low surface energy films, coatings, moldings, paints, foams, adhesives, and fiber reinforced composites, and the like.

BACKGROUND OF THE INVENTION

Laminar flow is the smooth, uninterrupted flow of air over the contour of wings, fuselage, or other parts of an aircraft in flight. Maintenance of laminar flow during cruise may become an operational necessity for future fuel-efficient aircraft configurations. Laminar flow can be maintained in the streamwise direction on an aircraft wing either passively through natural laminar flow induced by the shape of the airfoil, actively by laminar flow control through perforations on the airfoil that can introduce suction, or by hybrid laminar flow control which combines the two approaches. Factors that can destabilize a laminar boundary layer and cause transition to turbulent flow include adverse pressure gradients, surface roughness, heat, and acoustic energy. In the case of surface roughness, the critical height of a topographical imperfection that induces transition from laminar boundary layer flow to turbulent is dependent on the airfoil and Reynolds number and can be as small as several microns. Flight tests have shown that insect strikes on wing leading edge surfaces can leave residue exceeding the critical heights sufficient to disrupt laminar flow and decrease fuel efficiency. These residues have long been recognized to adhere to exposed aircraft surfaces. Specifically, the drag coefficient measured on an aircraft wing was determined to increase as much as 100% according to previous studies. Studies have shown that airborne insect densities are greatest between ground level and 153 m, with the highest insect population present during conditions of light winds (2.6 to 5.1 m/s), high humidity, and temperatures ranging from 21° C. to 29° C. As a consequence, aircraft are most susceptible to insect strikes during taxi, takeoff, initial climb, approach, and landing. Similarly, insect debris can influence the efficiency of wind turbines.

The development of surface roughness from insect strikes involves numerous complex chemical reactions. A comprehensive review of the relationships between airflow, insect strike location, and the resultant insect residue heights was published in Coleman, W. S. "Boundary Layer and Flow Control", ed. G. V. Lachman, Pergamon Press, 1961 ("Coleman"). Based on Coleman's report, impacts from insects during air travel are most likely to occur on the leading edge and immediately surrounding area of an aircraft wing. Thus, natural laminar flow would be interrupted, diminishing fuel burn rate improvements arising from airfoil shape, as well as, negating further efficiency improvements from hybrid laminar flow systems. Numerous approaches to mitigate insect residue adhesion on the wing leading edge surface have been investigated over the past 60 years. The easiest and most economical of these approaches relied upon the natural erosion of insect residue through a combination of air temperature, flight speed, and moisture provided by flying through clouds. However, this approach is too condition-dependent to be reliable. In other approaches, hardware-based solutions have included mechanical scrapers, deflectors, paper, and/or other coverings. While these technically solved the problem, these approaches were either difficult to implement and/or necessitated a weight penalty preventing implementation on a commercial scale. As another example, the Krueger flap is a deflector designed to improve lift for large aircraft (e.g. on the Boeing 737 and the Boeing 747) during takeoff. Although it has been shown to negate insect residue from the wing leading edge so as to retain laminar flow on the upper wing, physical discontinuities of the flap may induce early boundary layer transition on the lower wing surface.

Physical and chemical modifications to the wing leading edge surface have been investigated including elastic surfaces, coatings, soluble films, and fluid covers. Elastic surfaces were found to work well with minimal traces of insect residue, but rain erosion and hail were a concern due to potential damage to the surface. Soluble films, such as glycerin, provided a good barrier to insect residue adherence to the wing surface and could be easily washed or blown away taking the insect residue with it. Problems with this strategy were that it was only useful upon takeoff, had to be applied prior to every flight, and if the film did not provide complete coverage (i.e. wetting) over the wing then insect residue would stick to the non-wetted wing surfaces. Fluid covers formed through a continuous liquid discharge from the deicing system were successful in preventing a majority of insect residue from adhering to the surface; however, it was only effective when turned on. Besides coverage and environmental concerns, weight and economic penalties associated with transporting the fluid necessary for the portions of the flight profile where insect strikes are a problem as described above could be problematic, as well as complete coverage of the wing surface by the fluid as previously mentioned.

BRIEF SUMMARY OF THE INVENTION

Various embodiments provide epoxy modified fluorinated urethane compositions that may provide desirable bulk mechanical properties of conventional coatings, adhesives, or structural matrix resins, while simultaneously exhibiting surface properties that may reduce surface contamination.

The various embodiments provide formulations comprising epoxy modified fluorinated alkyl ether including urethane oligomer or polymer resins that may possess the requisite thermal, mechanical, chemical, and optical properties while achieving a low surface energy. In various embodiments, such resins may be prepared from random urethane oligomer compositions including fluorinated alkyl ether segments, in which the oligomers may be terminated with amino groups and subsequently reacted with epoxy including monomers or oligomers. During the curing process, the fluorinated alky ether oligomer of the random urethane component may migrate to the exterior (i.e., air side) surface of the resin formulation, resulting in a low energy surface. Combinations of resin compositions according to the various embodiments were prepared from this chemistry that exhibited a unique combination of bulk and surface properties making the various embodiments useful in formulating coatings, paints, composites, and adhesives for aerospace applications.

The various embodiments provide resin compositions derived from unique chemical structures including random urethane oligomer compositions including fluorinated alkyl ether segments, in which the oligomers may be terminated with amino groups and subsequently reacted with epoxy containing monomers or oligomers.

The various embodiments provide a synthetic method for the preparation of random urethane oligomer compositions including fluorinated alkyl ether segments, in which the oligomers may be terminated with amino groups and subsequently reacted with epoxy containing monomers or oligomers.

The various embodiments provide coating, paint, adhesive and matrix resin compositions comprised of random urethane oligomer compositions including fluorinated alkyl ether segments, in which the oligomers may be terminated with amino groups and subsequently reacted with epoxy containing monomers or oligomers.

The various embodiments provide a coating comprised of the random urethane oligomer compositions including fluorinated alkyl ether segments, in which the oligomers may be terminated with amino groups and subsequently reacted with epoxy including monomers or oligomers that exhibit good adhesion to a variety of substrates while concurrently minimizing adhesion to a variety of organic and inorganic contaminants, surface particle contamination, biological species, and insect residue to the air surface of the coating. In various embodiments, surface migration of the fluorinated alkyl ether segments may occur resulting in a resin that may be chemically anisotropic.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
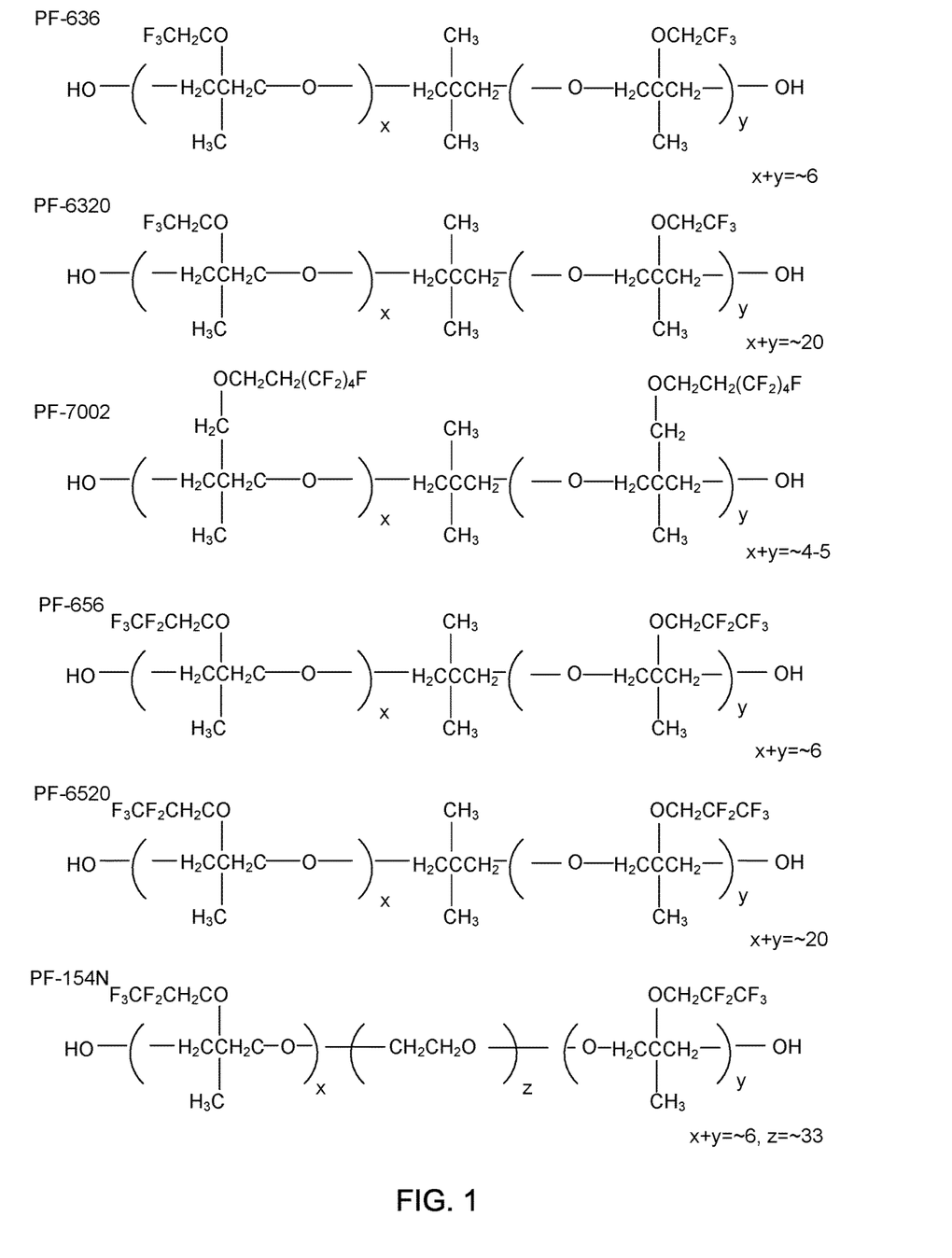
FIG. 1 illustrates representative chemical structures of fluorinated alkyl ether diols suitable for use in the various embodiments.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. As used herein, the term "abhesive" means lack of adhesion (i.e., a non-stick surface), and the opposite of adhesion.

Engineered coatings with the ability to minimize drag and the adhesion of an array of substances such as insect residue, dirt, ice, and bio-organisms, are continuously being researched for application on the surface of aircraft, automobiles, oil drilling rigs, ship hulls, water intakes in power plants, etc. Future designs for aircraft that take advantage of natural laminar flow in order to improve fuel efficiency is an example of technology that may benefit from the development of these engineered coatings. Prior investigation has shown that fuel efficiency as high as about 12% is possible with hybrid laminar flow control and natural laminar flow for long haul flights. In order to take advantage of the potential fuel efficiency gains from natural laminar flow, the aerodynamic surfaces must remain relatively smooth and resist the accumulation of any substances that can interrupt the laminar flow, such as insect residue. Strategies that benefit from a passive approach to minimize surface contamination may be beneficial in environments where active mitigation of contamination or fouling may be impractical or inaccessible. Coatings that utilize a passive approach show promise, and may be needed to fulfill all of the requirements needed to preserve natural laminar flow. A promising approach in the development of these coatings may involve modifying the surface energy of the material chemically, topographically, or by using combinations thereof.

Polymeric materials designed to have low surface energy may be used in applications that require antifouling, reduced water and ice adhesion, to minimize dust and debris contamination, and to modify the performance of microfluidic systems and biomedical devices. The ability to selectively modify the surface energy of high performance polymeric materials without sacrificing their superior mechanical, thermal, or optical properties may be of significant utility.

A variety of approaches may provide a polymeric material with low surface energy. A number of the most well-known materials having low surface energy are fluorinated, aliphatic polymers, such as those available under the trade name TEFLON®. It is the presence of both the fluorine atoms and the aliphatic carbon species that contribute to the low surface energy of this class of material. While these polymeric materials are well-known, they have a fairly homogeneous composition that does not utilize controlled modification and cannot be readily tailored for the introduction of additional surface features. In addition, these polymeric materials have difficulty adhering to substrates, and the polymer is generally only available as a powder that must be sintered, melted, or vapor deposited to coat the desired surface. Due to these difficulties in coating, delamination can become an issue during use. Vapor deposition of highly fluorinated carbonaceous materials to various substrates may be another approach utilized.

Another approach to provide low surface energy polymeric materials may be to incorporate surface modifying agents into the materials. These surface modifying agents may be thermodynamically driven to the surface of the polymeric material due to more favorable interactions at the air interface as compared with interactions within the bulk polymeric matrix.

Fluorine-containing oxetane derivatives may be used as surface modification agents for modification of urethanes. For example, U.S. Pat. No. 5,100,569 describes such a composition. Additionally, Omnova Solutions Inc. offers a family of hydroxyl terminated oxetane-derived oligomers containing pendant fluoro groups under the trade name POLYFOX® fluorochemicals.

Polyurethanes have an excellent combination of physical and mechanical properties that may make them useful in a broad array of applications. A number of studies involving structure property relationships of polyurethanes have been reported. Fluorine containing diols have been used in polyurethane synthesis to create polymeric films with low surface energy, for example Y. Tang, J. Santerre, R. Labow and D. Taylor, "Synthesis of surface-modifying macromolecules for use in segmented polyurethanes," *J. Appl. Polym. Sci.*, vol. 62, pp. 1133-1145, 1996 ("Tang") reported polyurethanes modified with about 5% of a fluorinated diol that exhibited water surface wetting characteristics comparable to that of a fully fluorinated polymer, e.g. Teflon®, with no measureable loss of bulk properties. However, a complete understanding and concomitant ability to prevent adhesion of complex, active and dynamic chemical systems such as those encountered with biological species remains a significant challenge. The modification of surface energy alone has proven to be insufficient to prevent such materials from adhering to polymeric surfaces. Other approaches have used SMAs to ferry other chemically active species to a material surface which otherwise would not spontaneously surface migrate.

Many polymer coating formulations are curable coating compositions, meaning that a crosslinking reaction takes place between the polymer formulation and the substrate. Epoxies are a class of reactive monomers which contain epoxide groups. Epoxies can be reacted or cross-linked with either themselves via catalytic homopolymerization, or with a wide range of co-reactants (i.e. hardeners) including thiols, alcohols, acids, anhydrides, phenols, and amines. Reacting multifunctional epoxides with themselves or with a multifunctional hardener forms a thermoset polymer, often resulting in a system with increased mechanical properties and temperature and chemical resistance. There is a considerably broad scope of chemistry and property combinations utilizing epoxy based chemistry, resulting in a multitude of epoxy formulations available. Hence, epoxy formulations have an extensive range of applications in the formulation of coatings, composites, adhesives, and paints, as well as other applications. Accordingly, the various embodiments provide a polymeric material that has the mechanical, thermal, chemical, and optical properties associated with a unique combination of properties derived from both urethanes and epoxies, yet achieves a low energy surface.

Coatings offer an advantage over previous strategies for maintaining laminar flow due to ease of application, potentially negligible weight penalty, reduced environmental concerns, better economics, and continual function throughout the flight profile.

The various embodiments provide compositions comprising random urethane oligomer compositions including fluorinated alkyl ether segments, in which the oligomers may be terminated with amino groups and subsequently reacted with epoxy containing monomers or oligomers and applications of the compositions. The various embodiment compositions may be prepared by reacting a molar excess of a diisocyanate, with a diol, and a fluorinated alkyl ether diol, to form a diisocyanate terminated random urethane oligomer or polymer. This material may be subsequently reacted with a diamine to produce a diamine terminated oligomer which may be subsequently reacted with any epoxy compound, oligomer, or polymer and cured to produce a solid resin. Other compounds, catalysts, reagents, chemicals, components, materials, curing agents and additives may be included in these compositions. The various embodiment compositions exhibit a unique and unexpected combination of properties in that the surface properties may be much different from those of the bulk resin. This unique combination of properties enables the various embodiment compositions to be used in applications that require high mechanical and adhesion properties of the bulk resin, but low adhesion properties on the surface.

Various embodiments may provide an epoxy modified fluorinated alkyl ether containing urethane oligomer or polymer composition, may provide a coated substrate including an epoxy modified fluorinated alkyl ether containing urethane oligomer or polymer composition, and may provide a process for producing an epoxy modified fluorinated alkyl ether containing urethane oligomer or polymer composition. In various embodiments, an epoxy modified fluorinated alkyl ether containing urethane oligomer or polymer composition may be a reaction product of at least one epoxy resin and at least one amino terminated fluorinated alkly ether containing urethane oligomer or polymer. In various embodiments, the epoxy resin may inlcude at least one of glycidyl, alicyclic epoxy, oxirane, or a ethoxyline group. In various embodiments, the terminated fluorinated alkyl ether containing urethane oligomer or polymer may include at least one amine which reacts with the epoxy resin and at least one fluorinated pendant group which migrates to the surface of the composition. In various embodiments, the epoxy modified fluorinated alkyl ether containing urethane oligomer or polymer composition may include a curing agent having one or more functional groups selected from the group consisting of amines, phenols, anhydrides, thiols, alcohols, organic carboxylic acids and salts, acyl chlorides, aldehydes, ketones, Grignard reagents, water, sodium hydroxide, and inorganic acids and their salts. In various embodiments, the epoxy modified fluorinated alkyl ether containing urethane oligomer or polymer composition may include an additive, such as one or more of fillers, fibers, surfactants, binders, crosslinking agents, diluents, coupling agents, thermal stability agents, flame retardant agents, anti-dripping agents, lubricants, mold release agents, nucleating agents, anti-static agents, catalysts, colorants, antioxidants, and UV stabilizers. In various embodiments, the epoxy modified fluorinated alkyl ether containing urethane oligomer or polymer composition may include a filler, such as one or more of silica, fumed silica, molybdenum disulfide, iron oxide, and inorganic oxides, and the filler may be present in an amount of about 1-40 wt. % based on the total weight of the composition. In various embodiments, producing the epoxy modified fluorinated alkyl ether containing urethane oligomer or polymer composition may include dissolving the epoxy resin, the amino terminated fluorinated alkyl ether containing urethane oligomer or polymer, and at least one curing agent in a solvent, such as methyl ethyl ketone. In various embodiments, producing the epoxy modified fluorinated alkyl ether containing urethane oligomer or polymer composition may include coating the dissolved composition on a substrate, such as glasses, ceramics, metals (e.g., aluminum), metal alloys, one or more polymers, plastics, wood, carbon allotropes, and inorganic oxides, etc., for example by coating the dissolved composition on the substrate as a isocyanate-free urethane. In various embodiments, coating the dissolved composition on the substrate comprises spray coating or dip coating the composition on the substrate and curing the sprayed or dipped coating. In various embodiments, producing the epoxy modified fluorinated alkyl ether containing urethane oligomer or polymer composition may include adding fillers of reacted expoxy resin and amino terminated fluorinated alkyl ether containing urethane oligomer or polymer. In various embodiments, producing the epoxy modified fluorinated alkyl ether containing urethane oligomer or polymer composition may include applying a pretreatment to the substrate before spray coating the dissolved composition on the substrate. In various embodiments, the substrate may be an adhesive-backed material. In various embodiments, the curing process may include thermal curing, UV-light exposure, and ambient condition curing. In various embodiments, a coated substrate may include a substrate and a coating obtained from a reaction product of at least one epoxy resin and at least one amino terminated fluorinated alkyl ether oligomer or polymer. In various embodiments, the coated substrate may be configured to be cleaned of any residual contaminations.

Various embodiment urethane based formulations were synthesized and applied to surfaces via spray application. The various embodiment urethane oligomers included fluorinated aliphatic chemical species and may or may not include various fillers with sizes ranging from nanometer to micrometers. Specimens with spray-applied urethane based formulations demonstrated hydrophobicity and a significant reduction in contaminant adhesion as determined in a controlled fruit fly impact chamber. The durability of the various embodiment coatings was comparable to state-of-the-art formulations and satisfied current aircraft manufacturing requirements. The various embodiment coatings may have advantageous use in aerospace applications, wind turbine systems, and automotive industry, among other industries.

A urethane based formulation was investigated since urethanes are the basic component of a majority of aerospace coatings used on commercial aircraft. After preliminary investigations, a urethane prepared from 2,4-toluene diisocyanate (TDI) and 1,4-butanediol was selected that was further modified by inclusion of an oxetane-derived fluorinated oligomer (PF656, Omnova, Batch #2234AM-46). The hydroxyl terminated alkyl ether oligomer included fluorinated side chains comprised of a perfluorinated ethylene. The amount of PF656 used was about 10 mole percent of the total diol content. The urethane based formulation was terminated with ethylenediamine. To prepare a solution for spray application, the urethane oligomer was dissolved in methyl ethyl ketone (MEK) along with tetraglycidal methylene dianiline (TGMDA), and 2-ethyl-4-methylimidizole. This mixture was then prepared at about 8 wt % in methyl ethyl ketone (MEK) and was used via spray application on various substrates. Once spray-coated on a substrate, the prepared specimen was placed in a forced air chamber to remove any residual solvent. Next, the specimens were exposed to conditions appropriate to fully cure the epoxy. The imidazole catalyst, 2-ethyl-4-methylimidizole, was used as a catalyst to lower the epoxy ring-opening reaction temperature (about 120° C.). This particular formulation has been evaluated for insect residue adhesion.

Filler materials have been included in these compositions to introduce topography with possible changes in surface chemistry. Several filler materials have been investigated including molybdenum disulfide ($MoS_2$), silica ($SiO_2$), among others. The fillers range in size from nanometers to micrometers with various filler shapes having been investigated including spherical, cylindrical, platelet, and amorphous. The filler content of the solids component of the spray solution ranged from about 1 wt % to about 40 wt %.

The use of a diamine to terminate an active diisocyanate at the end of a polyurethane is a significant change from the standard approach in polyurethane synthesis. Previous methods converted a hydroxyl-terminated polyurethane to an amine group instead of directly terminating the active isocyanate with a diamine. The amine termination of the various embodiments provides the urethanes with the ability to cross-link with an epoxy. The crosslinking resulted in an increase to the overall mechanical and thermal properties of the coating. Additionally, as the urethane oligomer is ultimately amine terminated, the various embodiment coatings may be applied (e.g., via spray coating, dip coating, or any other coating technique) as an isocyanate-free urethane. In this manner, the various embodiments may be applied without the inherent physical and environmental concerns associated with using very reactive isocyanates.

The prepared coatings can be classified as hydrophobic based on their water contact angles. Water droplets placed on the surface would consistently exhibit advancing water contact angles of about 108° or greater. The main reason being the fluorinated SMA's migrate to the surface. Based on water contact angle data and insect residue mitigation properties, the incorporation of the fluorinated oligomers alters the surface chemical properties, while the bulk properties are consistent with a polyurethane.

Coatings prepared as described above were tested for adhesion mitigation of insect residues in a controlled insect impact facility using fruit flies propelled toward the engineered surface at about 150 mph. Once impacted, the remaining residue height and areal coverage were determined using an optical profilometer. For aerospace applications, reduction in remaining residue height and areal coverage is desired.

Isocyanates

The random urethane co-oligomers of the various embodiments may be prepared according to various methods, such as by reaction of a polyisocyanate, defined as having at least two isocyanate groups, with a polyol, defined as having at least two hydroxy groups, with an appropriate molar excess of isocyanate groups so as to form an oligomeric or polymeric urethane having predominately isocyanate endgroups. Examples of polyisocyanates useful in the preparation of polyurethane polymers of the various embodiments include aliphatic, aromatic, cycloaliphatic and heterocyclic polyisocyanates, and mixtures of such polyisocyanates.

Further examples of polyisocyanates useful in the preparation of polyurethane polymers of the various embodiments include, but are not limited to, toluene-2,4-diisocyanate; toluene-2,6-diisocyanate; diphenyl methane-4,4-diisocyanate; diphenyl methane-2,4'-diisocyanate; para-phenylene diisocyanate; biphenyl diisocyanate; 3,3'-dimethyl-4,4"-diphenylene diisocyanate; tetramethylene-1,4-diisocyanate; hexamethylene-1,6-diisocyanate; 2,2,4-trimethyl hexane-1, 6-diIsocyanate; lysine methyl ester diisocyanate; bis(isocyanato ethyl)fumarate; isophorone diisocyanate; ethylene diisocyanate; dodecane-1,12-diisocyanate; cyclobutane-1,3-diIsocyanate; cyclohexane-1,3-diIsocyanate; cyclohexane-1, 4-diIsocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diIsocyanate; perhydrodiphenylmethane-2,4'-diisocyanate; perhydrodiphenylmethane-4,4'-diisocyanate and mixtures thereof.

Diols

Diols are compounds, oligomers, or polymers that have at least two hydroxyl functionalities present. The at least two hydroxyl functionalities may be located at the ends of the compounds, oligomers, or polymers, pendent, or a combination thereof. Examples of monomeric diols suitable for use in the various embodiments include, but are not limited to, 1,2-ethylene glycol, 1,4-butanediol (1,4-BD), diethylene glycol, glycerine, and trimethylolpropane. The polymeric diols (i.e. polyols) may be formed by base-catalyzed addition of propylene oxide and/or ethylene oxide onto a hydroxyl or amine including initiator, or by polyesterification of a di-acid, such as adipic acid, with glycols, such as ethylene glycol or dipropylene glycol. The most common polyols suitable for use in the various embodiments may be polyether polyols, polycarbonate diols, and polyester polyols. The molecular weight of the polyols suitable for use in the various embodiments may cover a broad range from oligomeric to high molecular weight polymer.

Fluorinated Alkyl Ether Diols

The fluorinated alkyl ether diols used in the various embodiments may include those described in U.S. Pat. No. 5,100,569, incorporated herein by reference in its entirety, some of which may be represented by the formulas:

or wherein $R^6$ may be substituted or unsubstituted aliphatic or aromatic moiety of 2 to 16 carbons; $R^2$ is —H, —F, or alkyl of 1 to 6 carbon atoms; $R^3$ may be —F, —$R^4$H(n-a)$F_a$, —$R^5$—O—$R^4$H(n-a)$F_a$, and —O—$R^4$H(n-a)$F_a$; $R^4$ may be an alkyl or ether moiety of 1 to 30 carbons; $R^5$ may be an alkyl moiety of 1 to 30 carbons; a may be an integer of 3 to n; n may be twice the number of carbon atoms in the alkyl moiety plus 1; m may be between about 4 and 500, p may be between about 4 and 150; q may be between about 1 and 150, and q is between about 4 and 150, and r is at least 1.

Representative chemical structures of the fluorinated alkyl ether diols suitable for use in the various embodiments include, but are not limited to, the structures presented in FIG. 1.

The amount of fluorinated alkyl ether segment in the urethane oligomer or polymer, and present in the final cured resin composition may range from about 0.01 to 100% by weight. In particular, the amount of amino terminated fluorinated alkyl ether containing urethane oligomer or polymer, may range from about 0.1% to about 25%, about 0.1% to about 10%, about 0.1% to about 5%, about 0.5% to about 5%, or about 1% to about 5% by weight.

Urethane Reaction Catalysts

Catalysts used in the synthesis of various embodiment urethanes may include, but are not limited to, amine compounds and organometallic complexes. Tertiary amine catalysts may include, but are not limited to, triethylenediamine also known as 1,4-diazabicyclo[2.2.2]octane (DABCO) available from Air Products and Chemicals, dimethylcyclohexylamine (DMCHA), and dimethyl-ethanolamine (DMEA). Organometallic compounds based on mercury, lead, tin (dibutyltin dilaurate), bismuth (bismuth octanoate), and zinc are used as polyurethane catalysts. Mercury carboxylates, such as phenylmercuric neodeconate, are particularly effective catalysts. Bismuth and zinc carboxylates have also been used as catalysts in the synthesis of urethanes. Alkyl tin carboxylates, oxides and mercaptides oxides are used including but not limited to dibutyltin dilaurate, dioctyltin mercaptide and dibutyltin oxide.

Diamines for Urethane Chain Termination

Diamines may be used in the various embodiments to react with the predominately isocyanate terminated random urethane oligomer compositions including fluorinated alkyl ether segments to produce predominately amino terminated random urethane oligomer compositions including fluorinated alkyl ether segments. In some embodiments this reaction may be conducted in-situ by adding the diamine to the reaction vessel including the predominately isocyanate terminated random urethane oligomer containing fluorinated alkyl ether segments. Any diamines may be used, and in some embodiments the diamine may be an aliphatic diamine, such as to 1,2-diaminoethane (1,2-ED), 1,3-diaminopropane, 1,4-diaminobutane, 1,5-diamino pentane, 1,6-diaminohexane, isomers of cyclohexane diamine, and combinations thereof.

Epoxies for Reacting with the Amino Terminated Urethanes

One epoxy for use in the various embodiments may be N,N,N',N'-tetraglycidyl-4,4'-methylenedianiline (TGMDA), which is prepared from 4,4'-methylenedianiline and epichlorohydrin using a strong base. Formulations that utilize TGMDA epoxies are characterized by high cross-link densities, resulting in a high modulus of elasticity and high glass transition temperature. Typically, aerospace structural epoxy formulations are based on TGMDA. Another common epoxy is derived from 2,2'-dihydroxyphenyl isopropylidiene (bisphenol A). In particular embodiments, the epoxy resins may be aralkyl-type epoxy resins derived from bisphenol A. Any epoxy resin can be used in some embodiments, and the epoxy resin may include at least one glycidyl group, alicyclic epoxy group, or similar epoxy group (i.e., oxirane or ethoxyline). In certain embodiment compositions, the epoxy resin may have two or more epoxy groups that may react with terminal amino groups associated with the random urethane oligomers containing fluorinated alkyl ether segments of the various embodiments. Such epoxy resins include, but are not limited to, novolac-type epoxy resin, cresol-novolac epoxy resin, triphenolalkane-type epoxy resin, aralkyl-type epoxy resin, aralkyl-type epoxy resin having a biphenyl skeleton, biphenyl-type epoxy resin, dicyclopentadiene-type epoxy resin, heterocyclic-type epoxy resin, epoxy resin containing a naphthalene ring, a bisphenol-A type epoxy compound, a bisphenol-F type epoxy compound, stilbene-type epoxy resin, trimethylolpropane type epoxy resin, terpene-modified epoxy resin, linear aliphatic epoxy resin obtained by oxidizing olefin bonds with peracetic acid or a similar peracid, alicyclic epoxy resin, or sulfur-containing epoxy resin. In some embodiments, the epoxy resin may be composed of two or more epoxy resins of any of the aforementioned types. In some embodiment formulations, the epoxy resin may be composed of two or more epoxy resin of any of the previously mentioned epoxy types. In example embodiment formulations, the epoxy resins may be aralkyl-type epoxy resins, such as TGMDA and those derived from BPA. The epoxy may also include one or more additional components in various embodiments, for example, a benzoxazine compound or resin, chain extenders or crosslinkers for epoxy resins, or epoxy hardeners in such epoxy resin polymer compositions.

Optional Hardeners Used with the Epoxy/Urethane Compositions

Optionally, additional hardeners (curing agents) may be used with the epoxy urethane compositions of the various embodiment to achieve the desired combination of properties. There are no limiting conditions on the use of hardeners or curing agents, and hardening and curing agents are optional (i.e. may or may not be used). Examples of hardeners suitable for use in the various embodiments include imidazole, polyamidoamine, phenol novolak, dicyan diamide, hexamethylenediamine, various isomers of diaminodiphenylether (DDE), various isomers of diaminodiphenylsulfone (DDS), and 4,4'-methylenedianiline (MDA). Specifically, looking from the standpoint of reaction stability, amine-based hardeners and phenol-based hardeners may be preferred, with amine-based being particularly preferred. In some instances, an imidazole that serves as a polymerization catalyst for epoxy resin in conjunction with a hardener may be preferable. Curing accelerators may be used in alliance with these hardeners in various embodiments. A diamine curing agent may be aliphatic or aromatic and includes diamines containing other hetero atoms. One or more other diamines may be used in various embodiments. Examples of diamines include aliphatic diamine such as trimethylenediamine, tetramethylenediamine, pentamethylenediamine, hexamethylenediamine, 2,2,4-trimethylhexamethylenediamine, 2,4,4-trimethylhexamethylenediamine, octamethylenediamine and nonamethylenediamine; and an alicyclic diamine such as bis(4-aminocyclohexyl)methane and bis(4-amino-3-methylcyclohexyl)methane; aromatic diamine, for example, phenylenediamine, diaminotoluene, 2,4-diaminomesitylene, 3,5-diethyl-2,6-diaminotoluene, xylylenediamine (in particular, metaxylylenediamine, paraxylylenediamine), bis(2-aminoethyl)benzene, biphenylenediamine, a diamine having a biphenyl backbone (e.g., 4,4'-diamino-3, 3'-ethylbiphenyl), adiamine having adiphenyl alkane backbone [e.g., diaminodiphenylmethane, bis(4-amino-3-ethylphenyl)methane, bis(4-amino-3-methylphenyl)methane, 3,3'-dichloro-4,4'-diaminodiphenylmethane, 2,2'-bis(4-aminophenyl)propane], bis(4-aminophenyl)ketone, bis(4-aminophenyl)sulfone, or 1,4-naphthalenediamine, and an N-substituted aromatic diamine thereof; alicyclic diamine, such as 1,3-cyclopentanediamine, 1,4-cyclohexanediamine, and bis(4-amino-3-methylcyclohexyl)methane; an aliphatic amine, such as trimethylenediamine, tetramethylenediamine, pentamethylenediamine, hexamethylenediamine, 2,2,4-trimethylhexamethylenediamine, 2,4,4-trimethylhexamethylenediamine, and octamethylenediamine, and an N-substituted aliphatic diamine thereof; and ether diamines, such as poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide) terminated poly (ethylene ether)diamine, 4,4'-oxydianaline; and aminated random or block copolymers of tetrahydrofuran with minor amounts of a second monomer such as ethylene oxide, propylene oxide, methyl tetrahydrofuran, bis[4-(3-aminophenoxy)phenyl]methane, bis[4-(4-aminophenoxy)phenyl] methane, 1,1-bis[4-(3-aminophenoxy)phenyl]ethane, 1,1-bis[4-(4-aminophenoxy)phenyl]ethane, 1,2-bis[4-(3-aminophenoxy)phenyl]ethane, 1,2-bis[4-(4-aminophenoxy) phenyl]ethane, 2,2-bis[4-(3-aminophenoxy)phenyl]propane, 2,2-bis[4-(4-aminophenoxy)phenyl]propane, 2,2-bis[4-(3-aminophenoxy)phenyl]butane, 2,2-bis[4-(4-aminophenoxy) phenyl]butane, 2,2-bis[4-(3-aminophenoxy)phenyl]-1,1,1,3, 3,3-hexafluoropropane, 2,2-bis[4-(4-aminophenoxy) phenyl]-1,1,1,3,3,3-hexafluoropropane, 4,4'-bis(3-aminophenoxy)biphenyl, 4,4'-bis(4-aminophenoxy) biphenyl, bis[4-(3-aminophenoxy)phenyl] ketone, bis[4-(4-aminophenoxy)phenyl] ketone, bis[4-(3-aminophenoxy) phenyl] sulfide, bis[4-(4-aminophenoxy)phenyl] sulfide, bis [4-(3-aminophenoxy)phenyl] sulfone and bis[4-(4-aminophenoxy)phenyl] sulfone.

In various embodiments, the amount of curing agent may be selected based upon the type and amount of epoxy resin selected and the amount of terminal amino endgroups in the urethane oligomer. For example, the curing agent may be present in ratios ranging from 1:1 to 1:0.1, about 1:1 to 1:0.2, about 1:1 to 1:0.5, or about 1:1 to 1:0.8 of epoxy to curing agent.

Epoxy Curing Catalysts

In the various embodiments, any curing catalysts may be used such as, but not limited to, transition metal catalysts, tertiary amines, imidazole containing compounds, and the like and combinations thereof. Examples of the tertiary amine curing catalysts suitable for use in the various embodiments include triethylamine, benzyldimethylamine, pyridine, picoline, 1,8-diazabiscyclo(5.4.0)undecene-1, dicyandiamide, and the like, and Examples of the imidazole compound include, but are not limited to 2-methylimidazole, 2-ethylimidazole, 2-undecylimidazole, 2-ethyl-4-methylimidazole, 2-phenyl-4,5-dihydroxymethylimidazole and the like. The amount of the curing catalyst may be any amount that is effective for use as a catalyst and may be, generally, be from about 0.01 wt. % to about 20 wt. % based on the weight of the total composition. In some embodiments, the amount of curing catalyst may be, about 0.1 wt. % to about 15 wt. %, about 0.5 wt. % to about 10 wt. %, about 1.0 wt. % to about 5 wt. %, or any range or individual concentration encompassed by these example ranges. In some embodiments, an imidazole may be used that will serve as the epoxy resin polymerization catalyst in conjunction with a hardener. A curing accelerator or catalyst may be used in conjunction as necessary with these hardeners in the various embodiments. The catalyst may be latent in the various embodiments.

An embodiment method for making embodiment urethane compositions may include mixing the predominately amine terminated urethane oligomer with the epoxy and any other ingredients used in the formulation. Mixing may be conducted using a variety of methods known in the art with or without the use of a solvent.

An embodiment method for making embodiment urethane compositions may further include heating the mixture after the mixture has been mixed to form a substantially homogenous mixture to remove any solvent and produce a cured composition. Heating may be carried out at any suitable temperature that allows for good catalytic activity and evaporation of the solvent. In various embodiments, heating may be carried out from about 20° C. to about 250° C., about 50° C. to about 200° C., about 100° C. to about 150° C., or any range or individual temperature encompassed by these ranges. In certain embodiments, heating may be carried out in two or more steps. For example, a first heating step may include heating the mixture to a temperature suitable for evaporating the solvent such as, for example, about 40° C. to about 150° C. or about 50° C. to about 100° C. for a first time period, and a second heating step may including heating the mixture to a temperature suitable for curing the mixture such as, for example, about 100° C. to about 250° C. or about 150° C. to about 200° C. The time period for heating may vary among embodiments and may vary depending on the type of solvent used. Typically, heating may be carried out from about 60 minutes to about 300 minutes or any range or individual time period encompassed by this range. In embodiments in which heating is carried out for a first and second time period, a first heating step may be carried out for about 10 minutes to about 60 minutes, about 20 minutes to about 40 minutes or about 30 minutes, and a second heating step may be carried out from about 40 minutes to about 200 minutes or about 60 minutes to about 180 minutes or any range or individual time period encompassed by this range.

Optional Additional Components

Additional components such as, but not limited to, metal fibers, coupling agents, carbon fibers, continuous or chopped fibers, ceramic fibers, aramid fibers, surfactants, polymeric binders, organic binders, dilents, crosslinking agents, fillers (e.g. iron oxide, silica, molybdenum disulfide, inorganic oxides, silicon dioxide), boron nitride nanosheets, nanomeshes, flame retardant agents such as phosphates, phosphinates and phosphonates, and oligomers or polymers thereof, anti-dripping agents such as fluorinated polyolefins, silicones, and, lubricants, mold release agents such as pentaerythritol tetrastearate, nucleating agents, anti-static agents such as conductive blacks, carbon nanotubes, oxidized graphene, graphite, graphene and organic antistatics such as alkylsulfonates, polyalkylene ethers, perfluorosulfonic acid, perfluorobutane sulfonic acid potassium salt, and polyamide-containing polymers, antioxidants, colorants, inks, catalysts, dyes, UV stabilizers, and the like and any combinations thereof may be added to the embodiment urethane compositions. In some embodiments, these additional components may or may not chemically react with resin components and become chemically incorporated into the composition.

In embodiments when fillers are present, the fillers may range in size from nanometers to micrometers (e.g., about 1 nm to about 10 mm). In particular, the filler particles may range from about 1 nm to 500 nm, about 5 to 100 nm, or about 7 to 40 nm in size. The fillers may also be of any suitable shape, e.g., spherical, cylindrical, platelet, or amorphous, and may have smooth, rough or sharp edges and surfaces. In particular, when fillers, such as silica, molybdenum disulfide, iron oxide, inorganic oxides, and mixtures thereof, are used, the filler may be present in an amount of about 1 wt. % to about 40 wt. %, about 5 wt. % to about 40 wt. %, about 5 wt. % to about 30 wt. %, about 5 wt. % to about 20 wt. %, or about 5 wt. % to about 10 wt. % based on the total weight of the composition. In other embodiments, additional components such as glass fiber, carbon fiber, organic fiber, ceramic fiber or other fillers may be provided at much higher concentrations up to 70 volume percent (vol. %). For example, in some embodiments the novel epoxy compositions may include up to about 70 vol. % glass fiber, carbon fiber, organic fiber or ceramic fiber, and in other embodiments, they may include from about 5 vol. % to about 70 vol. %, from about 10 vol. % to about 60 vol. %, or about 20 vol. % to about 50 vol. % glass fiber, carbon fiber, organic fiber or ceramic fiber.

These additional components may be present to improve the processability or manufacturability of the composition, enhance composition aesthetics, or improve a particular functional property or characteristic of the coating composition or the resultant cured compositions, such as adhesion to a substrate or adjacent composition. Each optional ingredient can be included in a sufficient amount to serve its intended purpose, but preferably not in such an amount to adversely affect a coating composition or a cured coating resulting therefrom.

In such formulations, one or more additional components or additives may make up from about 0.01 wt. % to about 50 wt. % based on the total composition. Other formulations may include additional components such as carbon fiber, ceramic fiber, organic fiber, glass fiber, or other fillers may be provided at much higher concentrations up to about 70 vol. %. For instance, some formulations may include up to about 70 vol. % carbon fiber, glass fiber, organic fiber or ceramic fiber, and in other embodiment, they may include from about 5 vol % to about 70 vol %, from about 10 vol. % to about 60 vol. %, or about 20 vol. % to about 50 vol. % carbon fiber, glass fiber, ceramic or organic fiber.

For example, in some embodiments, the embodiment urethane compositions may be used as coatings on plastics, metals, glass, carbon, ceramic, or fiber reinforced composites or wood products which can be in a variety of forms, for example as a fiber, woven mat, nonwoven mat, cloth, broadgood, fabric, molding, laminate, foam, sheet, extruded shape or the like, and in other embodiments, the resin compositions of the invention can be used to fabricate coatings, free-standing films, fibers, foams, molded articles, paint formulations, adhesive formulations and fiber reinforced composites. In some embodiments, the urethane compositions may be used to formulate paints or coatings.

The various embodiment urethane compositions, due to their unique morphology, may exhibit outstanding adhesion to a variety of substrates while simultaneously having surface properties that resist adhesion of a variety of materials that come into contact with the surface exposed to the air. In addition, the embodiment urethane compositions comprised of the fluorinated alkyl ether oligomers and polymers exhibit good processability by a variety of techniques commonly used in the fabrication of films, coatings, foams, moldings, adhesives, and composites making these materials useful in applications, for example, in the aerospace, automotive, medical, nautical, preservation/restoration, energy harvesting, desalination, water treatment, rail and construction sectors that require low adhesion surfaces. These fabrication techniques may include spray coating or powder coating techniques commonly used. In addition, these articles are well suited for a variety of applications that require the low energy surface properties while maintaining bulk properties consistent with those of cured functional and structural urethane resins.

Process of Making Coating Compositions

The embodiment urethane/epoxy coating composition may be generated by mixing together the one or more epoxy containing compounds, oligomers, or polymers with the one or more amino terminated fluorinated alkyl ether urethane oligomer, or polymer and other optional components. For example, the coating compositions may be prepared by simply admixing the ingredients (i.e. epoxy compound, oligomer or polymer with the one or more amino terminated fluorinated alkyl ether urethane oligomer or polymer) in any desired order with sufficient mixing. The resulting mixture may be admixed until all the composition ingredients are substantially homogeneously blended. Mixing equipment can be operated in batch, semi-batch, or continuous mode. Examples of mixers include rotor-stator, microfluidizer, high pressure homogenizer, ultrasonic, impinging jet, Cowles™ blade, planetary mixers, and melt kneading devices such as extruders. If desired, solvents can be used to facilitate the mixing.

In the various embodiments, the coating compositions may be prepared by reacting the amine terminated fluorinated alkyl ether containing urethane oligomers or polymers with any epoxy compound, oligomer, or polymer including at least one glycidyl group, alicyclic epoxy group, oxirane group, or ethoxyline group. The coating composition may comprise the reaction product of the epoxy resin with the amine terminated fluorinated alkyl ether including urethane oligomer or polymer where the amine reacts with the epoxy resin and the fluorinated pendant group migrates to the surface of the coating composition to provide for low surface energies (i.e., 25 mN/m or less). The epoxy and amine terminated fluorinated alkyl ether containing urethane may be reacted under any suitable conditions known in the art involving various combinations of temperature, pressure and time.

If prepared for use as a coating, the various embodiment compositions may be prepared and applied as a solvent-free powder coating, as a substantially solvent-free hot melt coating, as a substantially solvent-free liquid admixture, or the resins may be reduced in viscosity by dilution with one or more solvents and applied as a liquid admixture. By way of example, the at least one epoxy resin, the at least one amine terminated fluorinated alkyl ether containing urethane oligomer or polymer, optionally, at least one curing agent; and optionally, additional components (e.g., fillers) may be dissolved in a solvent under agitation. Suitable solvents may include ketone containing solvents, such acetone, MEK (methyl ethyl ketone), cyclohexanone, DEK (diethyl ketone), MPK (methyl propyl ketone), MIBK (methyl isobutyl ketone), MAK (methyl amyl ketone), MIPK (methyl iso-pentyl ketone), mixtures thereof, or the like. Preferably, the solvent includes MEK, MAK and/or MIPK. If present, the filler content of the solids component of the solution (e.g., for spray coating) may range from about 5 wt. % to about 66 wt. % based on the total weight of the solution.

The dissolved composition may be coated on a substrate in various embodiments. The substrate may include any suitable substrate, such as glass, ceramic, metal and alloys, polymers, carbon allotropes, inorganic oxides, and adhesive-backed materials. The coating may be applied to the substrate using any suitable procedure such as spray coating, roll coating, coil coating, curtain coating, immersion coating, meniscus coating, kiss coating, blade coating, knife coating, dip coating, slot coating, slide coating, brushing, casting, spin coating, injection molding, or the like, as well as other types of pre-metered coating. Preferably, the coating is applied via spray coating.

After applying the coating composition onto the substrate, the composition can be cured using a variety of processes, including, for example, oven baking by either conventional or unconventional methods. In some embodiments, the coating composition may be a thermal-cure coating composition. In other embodiments, the coating composition may be a room temperature-cure coating composition. The curing process may be performed in either discrete or combined steps. The curing process may be performed thermally, as a result of UV-light exposure, may occur under ambient conditions, or may be a combination of these conditions. For example, the coated substrate can be dried at ambient temperature or under forced air to evaporate the residual solvent and/or leave the coating composition in a largely un-crosslinked (i.e. unreacted) or partially crosslinked state. The coated substrate can then be heated to fully cure the coating composition. In certain instances, the coating composition can be dried and cured in one step. In preferred embodiments, the composition is a heat-curable coating composition. For example, the coated substrate may be allowed to air dry, and subsequently, the coated substrate may be thermally curing under heating (e.g., about 100° C. to about 175° C. for about 2 hours to about 6 hours).

Properties and Applications

The fluorinated alkyl ether moieties present in the urethane oligomer or polymer act as surface modifying agents which migrate to the surface after applying the coating and before and during the reaction of the epoxy with the amine terminated urethane oligomer or polymer. When used as coatings, these coatings exhibit anisotropic properties in which the coating may adhere well to a substrate, but the air side of the coating may have excellent abhesive properties. For example, the air surfaces can have extremely high (e.g., >)100°) water contact angles enabling hydrophobic to super-hydrophobic surfaces. In some cases, water droplets placed on the surface readily slide off with tilt angles as low as a few degrees relative to horizontal. Several reasons for this include the fact that the fluorinated alky ether moieties will migrate to the surface resulting in a polymer matrix that is chemically anisotropic relative to the thickness direction of the coating. The coatings may also be transparent (i.e., not opaque), clear, or having no color. The particular fillers, when present, also provide topographical modifications to the surface resulting in increased roughness that enable entrapment of air generating a Cassie-Baxter wetting state which may be requisite for generation of a super-hydrophobic surface.

The surface energy may be quantified by measuring the hydrophobic characteristic of the surface by analyzing the contact angle of a drop of water, ethylene glycol, and diiodomethane, for example, on the surface. The shape of the water drop and the angle between the surface and the tangent of the water drop is called the contact angle and is related to the surface energy. In general, the greater the angle the lower the surface energy. The cured resin compositions of the present invention may exhibit a water contact angle greater than about 100, for example, ranging from about 100 to about 150, about 120 to about 150, or about 140 to about 150. The cured resin compositions may exhibit low surface energies of about 25 mN/m or less, for example, ranging from about 0.1 to about 25 mN/m, about 0.1 to about 20 mN/m, about 0.5 to about 15 mN/m, or about 0.5 to about 5 mN/m.

Due to the improved properties of the cured resin compositions, coated substrates, for example, may be readily cleaned of any and all residual contaminations. For example, coated surfaces impacted with fruit flies may have enhanced cleanability such that the adhered insect residue may be readily removed with water and a dampened cloth (e.g., a cheesecloth) with minimal effort.

In some embodiments, the urethane/epoxy resin compositions may be used, for example, as coatings on plastics, metals, glass, carbon, ceramic, adhesive formulations or in fiber reinforced composites or wood products which can be in a variety of forms, such as a fiber, woven mat, nonwoven mat, cloth, broadgood, fabric, molding, laminate, foam, extruded shape or the like. In other embodiments, the urethane/epoxy resin compositions may be used to fabricate coatings, free-standing films, fibers, foams, molded articles, adhesive formulations, and fiber reinforced composites. Since the materials described herein are hydrophobic, they can also provide corrosion protection to a variety of surfaces that undergo electrochemical corrosion upon the ingress of water.

Due to the properties that the materials of the various embodiments possess, they can be used in the various forms mentioned above for applications, such as, but not limited to; aircraft and aerospace vehicle (launch vehicles, helicopters, unmanned aerial vehicles, etc.) surfaces to prevent adhesion of a variety of materials such as insect reside, ice, dirt and dust, ship hulls, ship surfaces, barge surfaces, oil rig surfaces, pipes, valves and pumps (interior and exterior), electrical transmission wires and cables, filters, filtration components, electronic components, printed circuit boards (PCB)s, controlled fluid flow devices, medical implants, automobile, truck, motorcycle and boat surfaces, racing vehicle surfaces, infrastructural surfaces such as roads, bridges, building exteriors and interiors, stairs, railings, firefighting clothing and equipment, tactical, rescue and emergency response clothing, protective gear and equipment, windpower (windmill) blades and wind turbine systems, and exposed surfaces.

Additionally, the various embodiment materials may be used in construction material applications, such as coatings on wood, cement, concrete and other masonry forms to prevent or minimize water penetration, paper and fabric moisture barrier coatings for paper and cardboard products such as insulation, "tar" paper (usually placed underneath roofing shingles), cardboard molds for concrete, coatings on glass or ceramics for self-cleaning applications, structural and functional composites such as carbon ceramic or glass fiber reinforced composites used in the construction of automobiles, aircraft, boats, space vehicles, launch vehicles, construction products (such as shingles) in which the composite can, for example, provide structural mechanical properties and at the same time have a low adhesion surface or moisture resistant surface.

The materials of the various embodiments may be applied to a variety of substrates such as but not limited to various types of glasses, ceramics, metals, metal alloys, polymers, carbon allotropes, and inorganic oxides. Composites consisting of various combinations of chopped or continuous carbon, glass, inorganic, or organic fibers with an organic, metallic, metal oxide, organometallic, carbon or ceramic matrix. These substrates can be in a variety of forms, such as, but not limited to, flat, curved, concave, convex, or a variety of contours or combinations thereof. The substrates may be monolithic or combined in a multitude of ways including stacked, layered, or randomly intermixed. The substrates may be in the form of solid pieces, chopped or continuous fibers, woven mats or products, nonwoven mats or products, particulates of various dimensions, molded articles of complex shapes or architectures.

The various substrates may be pretreated to change the surface properties (surface energy), for example using, but not limited to, abrasive, mechanical, energetic radiation (laser, plasma electron beam, ultraviolet), chemical or electrochemical processes. Specific pretreatment of the substrate is substrate dependent. For example, with metals and metal alloys it may be desirable to pretreat the metal to remove any oils or grease remaining from a machining process or to create specific surface chemistries. For example with titanium 6Al-4V alloy, this often involves an acid etch to create a fresh oxide surface followed by a priming agent to preserve that surface. The surface pretreatment may include a solvent-containing or solvent-free chemical pretreatment. Other common pretreatments include sand or grit blasting, use of a coupling agent, use of a sizing agent, acid or base exposure, use of various types of lasers and plasmas, electron beams, ultraviolet exposures and other high energy type treatments or combinations thereof In some cases, these pretreatments may introduce random or patterned topographical features either intentionally or unintentionally. The topographical features can extend from a few nanometers to many micrometers in height and may, in some cases, be hierarchical in design (i.e. they have topography that covers the entire range of nanometer to micrometer in which the nanometer features are present on the surface of the micrometer features). The pretreatment may be applied to the substrate before spray coating the dissolved composition on the substrate to promote wetting and adhesion of the spray-deposited solution.

The embodiment urethane/epoxy resin compositions, due to their unique morphology, may exhibit outstanding adhesion to a variety of substrates while simultaneously having surface properties that resist adhesion of a variety of materials that come into contact with the surface exposed to air. In addition, the embodiment urethane/epoxy resin compositions comprised of the fluorinated alkyl ether containing urethane oligomers or polymers and epoxy compounds, oligomers or polymers exhibit good processability by a variety of techniques commonly used in the fabrication of films, coatings, foams, moldings, adhesives and composites making these materials useful in applications, for example, in the aerospace, automotive, and construction sectors that require low adhesion surfaces. These articles are well suited for a variety of applications that require the low energy surface properties while maintaining bulk properties consistent with those of cured functional and structural epoxy resins.

Experimentation

A more complete understanding of the various may be obtained by reference to the following examples that are provided for purposes of illustration only and do not limit the various embodiments.

Hydroxy terminated fluorinated alkyl ether oligomers were purchased from Omnova Solutions and used as received. 1,4-Butandiol (1,4-BD) was obtained from Sigma Aldrich and dried for 72 hours over 3 Å molecular sieves prior to use. 2,4-Toluene diisocyanate (TDI) from Sigma Aldrich was used as received. The catalyst dibutlytin dilaurate was used as received from Sigma Aldrich. Anhydrous dimethylformamide (DMF) was purchased from Sigma Aldrich and stored over 3 Å molecular sieves and filtered using a fritted glass funnel prior to use. Methyl ethyl ketone (MEK) was used as received. Polymer films were spray coated from ~8% w/w solutions in MEK onto aluminum panels [Al 1100, 3 mil (76.2 µm) thickness] and cured in an oven at 120° C. for 2 hours. The epoxy, D.E.R. 331 (epoxy equivalent weight of 187.5), was obtained from The Dow Chemical Company and used as received. All samples were prepared using 100 parts of epoxy and 80 parts of amino terminated urethane oligomer containing fluorinated alkyl ether equivalent weights. 1,2-ethylene diamine (1,2-ED) was obtained from Aldrich Chemical Company and used as received. Fumed silica (7 nm diameter, a hydrophilic silica material) and molybdenum disulfide ($MoS_2$, <2 µm diameter) were obtained from Sigma Aldrich and used as-received Aluminum (Al) 1100 alloy sheets approximately 76.2 μm in thickness were used as the coating substrate. Prior to surface coating, the Al alloy substrates were cleaned with absolute ethanol using a dust-free laboratory cloth and air-dried at room temperature. Spray coating of the various urethane/epoxy resin formulations was performed using an airbrush (Badger Model 250) pressurized with dry air inside a paint booth. Flightless fruit flies were purchased from The Fruit Fly Shop located in San Diego, Calif. Surface energy of the coatings was characterized via contact angle goniometry using a First Ten Angstroms FTA 1000B goniometer at ambient conditions. Contact angles were measured for each sample using an 8 μL drop of either water or ethylene glycol, and a 2 μL drop of methylene iodide. For each liquid, interfacial tension measurements were made of a suspended drop prior to experimentation to verify liquid purity and precision of the focused image. Contact angles were determined by drop shape analysis. For all surfaces, contact angles were measured for a minimum of three droplets. Surface energies were determined using the regression line analysis method developed by Kaelble, D. H., "Dispersion-Polar Surface Tension Properties of Organic Solids," *J Adhes.*, 2,1970, pp. 66-81 ("Kaelble").

To emulate flight conditions under which insect impact events occur, controlled fruit fly impact studies were conducted inside a benchtop wind tunnel. An insect delivery device was utilized to propel the fruit fly at velocities representative of aircraft takeoff speeds. Testing was conducted using a custom-built pneumatic insect delivery device constructed from a VACCON HIGHVAC HVP series 300-Venturi vacuum pump that was modified with an extended delivery nozzle to enable accurate positioning of the insect impact site. An impingement angle normal to the test surface was utilized. All tubing had an inner diameter (ID.) of 1.27 cm. A 1 cm long Teflon® tube protruded from the insect insertion port. Air pressure to propel the insects was supplied through a high-pressure air hose using house air at a pressure sufficient to emulate the speed of aircraft at takeoff and landing, approximately 240 km/h. A single insect was used per impact event. Coated Al alloy foils were mounted onto a ¼ scale model of a section of an aircraft wing, located about 2.6 cm from the delivery nozzle. Testing was conducted at ambient temperature (about 25° C.) and about 50% to about 60% relative humidity. For each event, the airflow was turned on prior to feeding the insect into the insect insertion port. The suction force rapidly ejected the insect from the delivery port for impact on the test surface. After each impact event the airflow was maintained for an additional 5 s to simulate wind shear experienced during actual flight conditions. High-speed photography was obtained during impact events using a Vision Research Phantom 12 camera at a speed of 50,000 frames per second.

Insect residue heights were characterized using a FRT of America optical surface μprofilometer (Microprof 100). Data were collected over the entire region containing visible insect residues at a resolution of 5 μm between data points and 40 μm line to line. Several processing steps were performed on the collected topographical data including: segmentation to remove false zero readings, fitting the baseline to a second-order polynomial, and masking any edge and surface defects. Areal coverage was determined using grain analysis that identified and summed all features above the lowest permissible data plane, typically 8-15 μm, as individual grains. The data plane threshold above the established baseline was necessary to sufficiently separate insect residue features from substrate anomalies.

Synthesis of Amino Terminated Urethane Oligomers and Polymers

Figure 2:
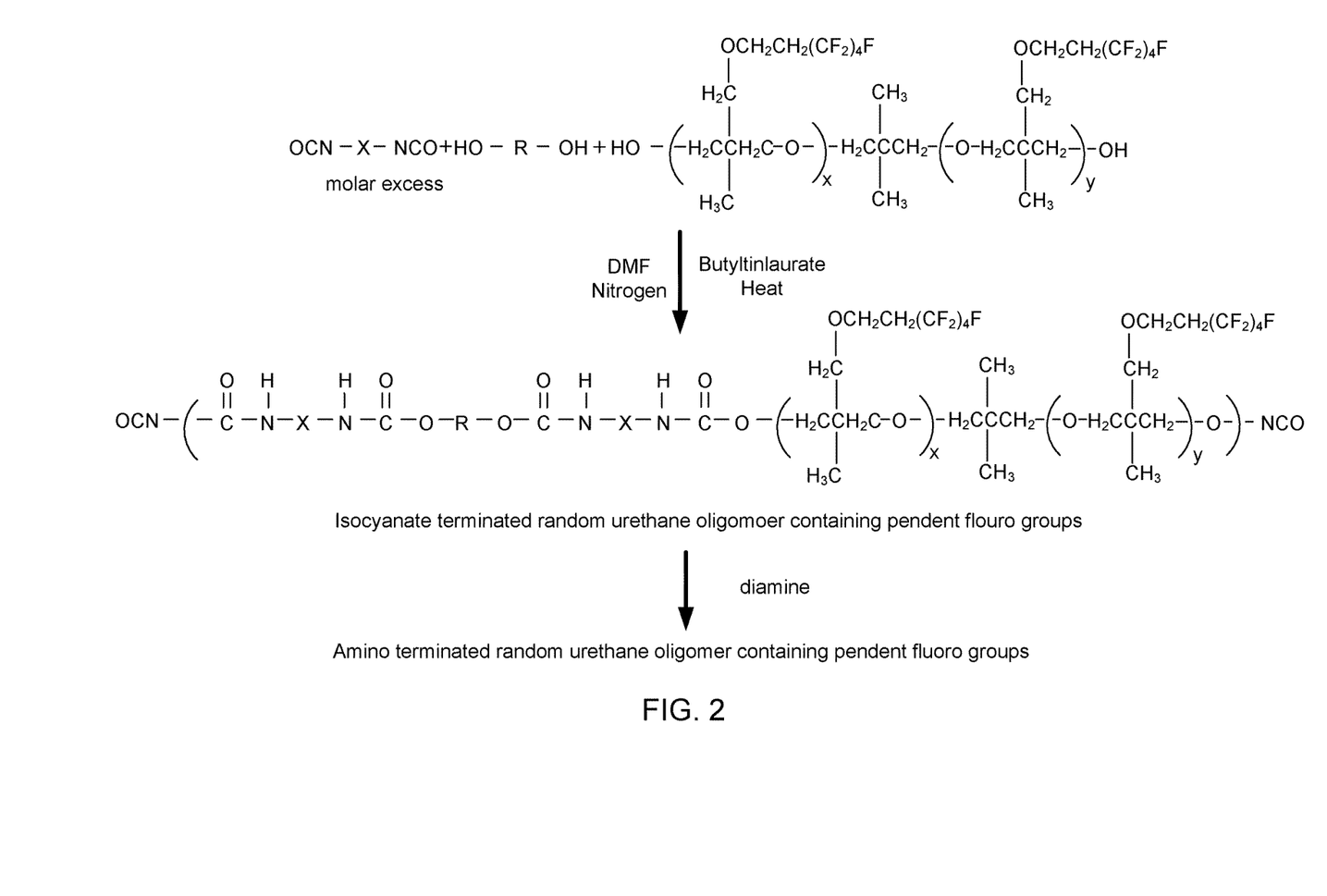
FIG. 2 illustrates a reaction sequence for synthesis of amino terminated random urethane oligomer containing pendent fluoro groups.

Controlled molecular weight amino terminated urethane oligomers and polymers containing various amounts of selected fluorinated alkyl ethers were prepared as follows:

Into a three-necked round bottom flask equipped with a mechanical stirrer, thermometer, nitrogen gas inlet and a pressure equalizing addition funnel was placed the diol or diol combination [for example, 1,4-butanediol (1,4-BD) and the fluorinated alkyl ether diol (PF-656)], dry N,N,-dimethylformamide (DMF, ~20% solids), and a catalytic amount of dibutyltin laurate (0.1 to 1% by weight). A calculated molar excess of the diisocyanate [for example, 2,4-toluene diisocyanate (TDI)] to achieve the targeted oligomer molecular weight was placed in the pressure equalizing addition funnel along with DMF. An appropriate molar excess to achieve the targeted molecular weight was calculated using the Carouthers equation: Dp=target molecular weight/0.5 (molecular weight of the repeat unit)=1+r/1−r, wherein Dp=the degree of polymerization and r=the stoichiometric offset relative to 1 mole. The entire reaction system had previously been dried and flushed with nitrogen gas. The reaction vessel was heated to and maintained at about 75-85° C., and the diisocyanate solution was slowly added over a several hour period under nitrogen gas flow. After addition of the diisocyanate, the reaction was maintained at 75-85° C. under a nitrogen atmosphere for several hours. At this point the solution contains a random urethane oligomer with predominately isocyanate end groups. A molar excess of a diamine [for example 1,2-ethylene diamine (1,2-ED)] was subsequently added and the reaction was allowed to continue for 30 minutes to 2 hours. The controlled molecular weight amino terminated urethane oligomer containing the selected fluorinated alkyl ether was isolated by precipitation in water, followed by washing in water and dried under vacuum at 75-100° C. until constant weight was achieved. This reaction sequence is notionally represented in FIG. 2.

Preparation of Coatings

This controlled molecular weight amino terminated urethane random oligomer was dissolved in MEK and a mixture of MEK and an epoxy was added to achieve a solution concentration of about 8% solids by weight. The molar ratio of epoxy to controlled molecular weight amino terminated urethane oligomers containing various amounts of selected fluorinated alkyl ethers was typically about 1:0.8. The molecular weights of the amino terminated urethane oligomers containing various amounts of selected fluorinated alkyl ethers were determined using $^1$H NMR spectroscopy. If fillers were added, they were mixed in at this time as well. The mixture was stirred, shaken, or ultrasonically treated to thoroughly mix the contents.

This solution was used to spray coat an Al substrate using an air brush type sprayer or the like, and the coating was air dried and subsequently thermally treated at 120° C. for at least 2 hours to cause the reaction with the epoxy to occur.

The resultant coatings on Al substrate were used to perform the various characterizations and fruit fly impact tests as described herein.

Composition of Coatings

The formulation of the coating compositions prepared following the procedure described above are presented in Table 1. In Table 1, in all examples, the diamine added at the end of the polymerization reaction was 1,2-ED. Additionally, "TDI"=2,4-toluene diisocyanate, "1,4-BD"=1,4-butanediol, "1,2-ED"=1,2 diaminoethane, "PDI"=1,4-phenylene diisocyanate, "PEG"=hydroxyl terminated poly (ethylene glycol) Mn 1500 g/mole, "HMDI"=hexamethylene diisocyanate, "DMPD"=2,2-dimethyl-1,3 propane diol, "PPTDI"=Poly(propylene glycol) 2,4-toluene diisocyanate terminated Mn 2300 g/mole, and "IPDI"=Isophorone diisocyanate. For comparison purposes, Examples 1, 2 and 3 did not have any fluorinated alkyl ether oligomers and were used as controls to compare various characterization and test results. As previously described, MEK solutions (8% solids by weight) or mixtures (if solid additives were present) were stirred, shaken, or ultrasonically treated to thoroughly mix the contents. This solution or mixture was used to spray coat an Al substrate using an air brush type sprayer or the like, and the coating was air dried and subsequently thermally treated at 120° C. for at least 2 hours to cause the reaction with the epoxy to occur.

TABLE 1

| Example No. | Diisocyanate | Diol, (mole %) | Fluorinated Diol, (mole %) | Calculated Molecular Weight, g/mole | Filler(s) Weight Percent |
|---|---|---|---|---|---|
| 1 | TDI | 1,4-BD | None | 5000 | None |
| 2 | TDI | 1,4-BD | None | 5000 | Fumed Silica (5) |
| 3 | TDI | 1,4-BD | None | 5000 | $MoS_2$ (10) |
| 4 | TDI | 1,4-BD (90) | PF-7002 (10) | 5000 | None |
| 4a | TDI | 1,4-BD (90) | PF-636 (10) | 5000 | None |
| 4b | TDI | 1,4-BD (90) | PF-6320 (10) | 5000 | None |
| 4c | TDI | 1,4-BD (90) | PF-656 (10) | 5000 | None |
| 4d | TDI | 1,4-BD (90) | PF-154N (10) | 5000 | None |
| 5 | TDI | 1,4-BD (90) | PF-7002 (10) | 5000 | Fumed Silica (5) |
| 5a | TDI | 1,4-BD (90) | PF-636 (10) | 5000 | Fumed Silica (5) |
| 5b | TDI | 1,4-BD (90) | PF-6320 (10) | 5000 | Fumed Silica (5) |
| 5c | TDI | 1,4-BD (90) | PF-656 (10) | 5000 | Fumed Silica (5) |
| 5d | TDI | 1,4-BD (90) | PF-154N (10) | 5000 | Fumed Silica (5) |
| 6 | TDI | 1,4-BD (90) | PF-7002 (10) | 5000 | $MoS_2$ (5) |
| 6a | TDI | 1,4-BD (90) | PF-636 (10) | 5000 | $MoS_2$ (5) |
| 6b | TDI | 1,4-BD (90) | PF-6320 (10) | 5000 | $MoS_2$ (5) |
| 6c | TDI | 1,4-BD (90) | PF-656 (10) | 5000 | $MoS_2$ (5) |
| 6d | TDI | 1,4-BD(90) | PF-154N (10) | 5000 | $MoS_2$ (5) |
| 7 | TDI | 1,4-BD (90) | PF-7002 (10) | 5000 | Fumed Silica (3.75) $MoS_2$ (1.25) |
| 7a | TDI | 1,4-BD (90) | PF-636 (10) | 5000 | Fumed Silica (3.75) $MoS_2$ (1.25) |
| 7b | TDI | 1,4-BD (90) | PF-6320 (10) | 5000 | Fumed Silica (3.75) $MoS_2$ (1.25) |
| 7c | TDI | 1,4-BD (90) | PF-656 (10) | 5000 | Fumed Silica (3.75) $MoS_2$ (1.25) |
| 7d | TDI | 1,4-BD (90) | PF-154N (10) | 5000 | Fumed Silica (3.75) $MoS_2$ (1.25) |
| 7e | TDI | 1,4-BD (90) | PF-656 (10) | 2500 | None |
| 7f | TDI | 1,4-BD (90) | PF-656 (10) | 8000 | None |
| 7g | TDI | 1,4-BD (90) | PF-656 (10) | 10000 | None |
| 7h | PDI | 1,4-BD (70) PEG (10) | PF-656 (10) | 10000 | None |
| 7i | HMDI | 1,4-BD (90) | PF-656 (10) | 8000 | None |
| 7j | HMDI | 1,4-BD (75) | PF-656 (25) | 10000 | None |
| 7k | HMDI | 1,4-BD (50) | PF-656 (50) | 10000 | None |
| 7l | TDI | 1,4-BD (99) | PF-7002 (1) | 5000 | None |
| 7m | TDI | 1,4-BD (99.9) | PF-7002 (0.1) | 5000 | None |
| 7n | TDI | 1,4-BD (80) | PF-7002 (20) | 5000 | None |
| 7o | TDI | 1,4-BD (70) | PF-7002 (30) | 5000 | None |
| 7p | TDI | None | PF-7002 (100) | 5000 | None |
| 7q | TDI | 1,4-BD (60) | PF-7002 (40) | 5000 | None |
| 7r | TDI | 1,4-BD (90) PEG (5) | PF-656 (5) | 8000 | None |
| 7s | HMDI | 1,4-BD (90) PEG (5) | PF-656 (5) | 8000 | None |
| 7t | HMDI | DMPD (90) | PF-656 (10) | 10000 | None |
| 7u | PPTDI | 1,4-BD (80) | PF-656 (20) | 10000 | None |
| 7v | TDI | DMPD (90) | PF-656 (10) | 10000 | None |
| 7w | IPDI | 1,4-BD (90) | PF-656 (10) | 10000 | None |
| 7x | IPDI | 1,4-BD (70) PEG (25) | PF-656 (5) | 10000 | None |
| 7y | IPDI | 1,4-BD (70) PEG (29) | PF-656 (1) | 10000 | None |

TABLE 1-continued

| Example No. | Diisocyanate | Diol, (mole %) | Fluorinated Diol, (mole %) | Calculated Molecular Weight, g/mole | Filler(s) Weight Percent |
|---|---|---|---|---|---|
| 7z | IPDI | 1,4-BD (35) DMPD (35) | PF-656 (30) | 10000 | None |

To emulate flight conditions under which insect impact events occur, controlled fruit fly impact studies were conducted inside a benchtop wind tunnel. Testing was conducted at ambient temperature (about 25° C.) and about 50% to about 60% relative humidity. For each event, the airflow was turned on prior to feeding the insect into the insect insertion port. The suction force rapidly ejected the insect from the delivery port for impact on the test surface.

After each impact event the airflow was maintained for an additional 5 s to simulate wind shear experienced during actual flight conditions. High-speed photography was obtained during impact events using a Vision Research Phantom 12 camera at a speed of 50,000 frames per second. This was repeated at least three times for each coating. The samples were subsequently characterized for insect residue heights and areal coverage.

EXAMPLES 1-7z

Synthesis of a variety of amino terminated urethane random oligomers and polymers were conducted in which the diisocyanate, diol or combination of diols and amount of pendent fluoro diol were varied, with the compositions shown in Table 1. In some cases, the compositions contained fillers as well. Select compositions were spray coated onto Al and other substrates, characterized and subjected to insect impact tests under the conditions previously described.

EXAMPLE 8

Substrate Adhesion Promotion Prior to Coating Deposition

Aluminum substrates were surface modified to promote adhesion by pretreatment with a diluted CHEMETALL® solution (1:7 V:V dilution with water) followed by a conversion coating application of Surface Treatment AC-131 (available from 3M™). Once prepared, the surfaces were spray coated with select compositions described in Example 7.

EXAMPLE 9

Ability to Clean Coated Substrate

Coatings were impacted with fruit flies and subsequently evaluated for cleanability. The surfaces were demonstrated to be readily cleaned of all adhered insect residue by manually wiping with a water dampened cheesecloth.

EXAMPLE 10

Preparation of a Coated Applique

Coatings generated according to Example 9 were spray coated onto adhesive-backed polyester and polyimide films and cured. The coated surface was determined to adhere to the adhesive backed material after curing and the coated substrate was demonstrated to readily bond to an aluminum substrate to act as an applique for mitigation of insect residues on aircraft surfaces.

In analyzing the results, many of the compositions comprising epoxy modified fluorinated alkyl ether containing urethane oligomer or polymer formulations exhibited lower aerial coverage compared to the control sample and in many cases were substantially less than that of the control. In addition, the epoxy modified fluorinated alkyl ether containing urethane oligomer or polymer formulations exhibited improved toughness, solvent resistance and weatherability compared to similar coatings without the epoxy modification. Thus, the compositions comprising epoxy modified fluorinated alkyl ether containing urethane oligomer or polymer epoxies exhibited an improved combination of properties including lower adhesion of the insect residue compared to the control epoxy making them useful in coating applications on a variety of substrates.

One formulation (example 4c in Table 1), was selected for scale up and prepared in 1 kilogram batches. Multiple large area panels Al (2 ft by 4 ft) were spray coated with this material and flown on a Boeing 757 aircraft (the Boeing ecoDemonstrator 757). The coated Al panels were mounted on the leading edge on one of the aircraft's wings and flown on a flight profile designed to accumulate insects. Compared to the control (Al) mounted adjacent to the coated panels, the epoxy modified fluorinated alkyl ether containing urethane coating exhibited significantly less insect accumulation than that of the control. In addition, in experiments where the ability to clean the surface were conducted, this coating showed better cleanability than the control surface.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or"

includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A coating composition comprising a mixture dissolved in a solvent, wherein the mixture comprises:
at least one epoxy resin;
at least one amino terminated fluorinated alkyl ether containing urethane oligomer or polymer; and
at least one curing agent.

2. The composition of claim 1, wherein:
the at least one epoxy resin comprises at least one of glycidyl group, alicyclic epoxy group, oxirane group, or an ethoxyline group; and
the at least one amino terminated fluorinated alkyl ether containing urethane oligomer or polymer comprises at least one terminal amine group which reacts with the at least one epoxy resin and at least one pendant fluorinated alkyl ether group which migrates to the surface of the composition.

3. The composition of claim 2, wherein the at least one curing agent comprises one or more functional groups selected from the group consisting of amines, phenols, anhydrides, thiols, alcohols, organic carboxylic acids, salts of said organic carboxylic acids, acyl chlorides, aldehydes, ketones, Grignard reagents, water, sodium hydroxide, inorganic acids, and salts of said organic inorganic acids.

4. The composition of claim 2, further comprising an additive selected from the group consisting of fillers, fibers, surfactants, binders, crosslinking agents, diluents, coupling agents, thermal stability agents, flame retardant agents, anti-dripping agents, lubricants, mold release agents, nucleating agents, anti-static agents, catalysts, colorants, antioxidants, and UV stabilizers.

5. The composition of claim 2, further comprising a filler selected from the group consisting of silica, fumed silica, molybdenum disulfide, iron oxide, and inorganic oxides, wherein the filler is present in an amount of about 5 wt. % to about 66 wt. % based on the total weight of the composition.

6. A coated substrate comprising:
a substrate; and
a coating produced by (1) applying the composition of claim 1 to the substrate, wherein the curing agent comprises a diamine, and (2) curing the epoxy groups to produce the coating.

7. The coated substrate of claim 6, wherein:
the at least one epoxy resin comprises at least one glycidyl group, alicyclic epoxy group, oxirane group, or an ethoxyline group; and
the at least one amino terminated fluorinated alkyl ether containing urethane oligomer or polymer comprises at least one terminal amine group which reacts with the at least one epoxy resin and at least one fluorinated alkyl group which migrates to the surface of the composition.

8. The coated substrate of claim 6, wherein the substrate is selected from the group consisting of glasses, woods, ceramics, metals, metal alloys, polymers, plastics, carbon allotropes, and inorganic oxides.

9. The coated substrate of claim 6, wherein the substrate is cleaned of any residual contamination prior to coating the substrate with the coating composition.

10. A process of producing a coating composition comprising:
admixing at least one epoxy resin, at least one amino terminated fluorinated alkyl ether containing urethane oligomer or polymer, and at least one curing agent; and
dissolving the mixture in a solvent.

11. The process of claim 10 wherein:
the at least one epoxy resin comprises at least one of glycidyl group, alicyclic epoxy group, oxirane group, or a ethoxyline group; and
the at least one amino terminated fluorinated alkyl ether containing urethane oligomer or polymer comprises at least one terminal amine group which reacts with the at least one epoxy resin and at least one pendant fluorinated alkyl ether group which migrates to the surface of the composition.

12. The process of coating a substrate comprisng:
producing a coating composition according to the process of claim 11; and
applying the coating composition to the substrate.

13. The process of claim 12, wherein the at least one amino terminated fluorinated alkyl ether containing urethane oligomer or polymer is isocyanate-free.

14. The process of claim 12, wherein the coating composition is applied to the substrate by spray coating or dip coating, and the proces further comprises curing the applied coating.

15. The process of claim 14, wherein the process of producing the coating composition further comprises the addition of fillers to the coating composition.

16. The process of claim 14, wherein the solvent of the coating composition is methyl ethyl ketone.

17. The process of claim 14, wherein the substrate is selected from the group consisting of glasses, ceramics, metals, metal alloys, polymers, plastics, wood, carbon allotropes, and inorganic oxides.

18. The process of claim 14, further comprising applying a pretreatment to the substrate before applying the coating composition to the substrate.

19. The process of claim 14, wherein curing is performed by thermal curing, UV-light exposure, or ambient condition curing.

* * * * *